(12) United States Patent
Shimoyama et al.

(10) Patent No.: US 9,250,158 B2
(45) Date of Patent: Feb. 2, 2016

(54) BUSH COMPONENT FORCE DETECTION DEVICE

(71) Applicant: Fuji Jukogyo Kabushiki Kaisha, Tokyo (JP)

(72) Inventors: Hiroshi Shimoyama, Tokyo (JP); Hiroki Nagano, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 14/265,151

(22) Filed: Apr. 29, 2014

(65) Prior Publication Data

US 2014/0331755 A1 Nov. 13, 2014

(30) Foreign Application Priority Data

May 8, 2013 (JP) .................................. 2013-098595

(51) Int. Cl.
*G01M 17/04* (2006.01)
*G01L 5/00* (2006.01)

(52) U.S. Cl.
CPC .............. *G01M 17/04* (2013.01); *G01L 5/0009* (2013.01)

(58) Field of Classification Search
CPC ..... G01L 5/0004; G01L 3/108; G01L 5/0057; G01L 5/0009; G01M 17/04
USPC .......... 73/117.03, 862.338, 862.044, 862.045
See application file for complete search history.

(56) References Cited

U.S. PATENT DOCUMENTS

| | | | | | |
|---|---|---|---|---|---|
| 3,481,192 | A | * | 12/1969 | Herzog | .................... G01L 3/10 73/514.02 |
| 4,474,060 | A | * | 10/1984 | Crossman | ................ B60T 8/52 188/181 T |
| 4,487,078 | A | * | 12/1984 | Schmitz | .................... G01L 5/24 73/862.045 |
| 4,577,513 | A | * | 3/1986 | Harwood | .............. G01L 3/1457 414/730 |
| 6,273,613 | B1 | * | 8/2001 | O'Brien | ................ F16C 11/045 384/448 |
| 6,766,685 | B2 | * | 7/2004 | Foley | .................... G01L 1/2225 73/121 |
| 7,188,535 | B1 | * | 3/2007 | Spletzer | .................. G01L 5/161 177/211 |

(Continued)

FOREIGN PATENT DOCUMENTS

JP 2004-270832 A 9/2004
JP 4339349 B 7/2009

(Continued)

OTHER PUBLICATIONS

Decision to Grant dated May 19, 2015.

(Continued)

*Primary Examiner* — Freddie Kirkland, III
(74) *Attorney, Agent, or Firm* — McGinn IP Law Group, PLLC

(57) ABSTRACT

A bush component force detection device detects a component force acting on a cylindrical bush inserted into a hole provided in a frame of a vehicle to pivotally support a rod-like member inside thereof. The bush component force detection device includes: an outer ring provided between the bush and the hole with predetermined space from the bush and configured to surround an outer circumferential surface of the bush and to be attached on an inner circumferential surface of the hole; and a sensing unit. The sensing unit is a cylindrical member disposed between the bush and the outer ring and configured to surround the bush, and has one end of connected with an outer side of the bush, the other end connected with the outer ring, and strain gauges disposed on an outer circumferential surface thereof.

4 Claims, 8 Drawing Sheets

(56) References Cited

U.S. PATENT DOCUMENTS

| | | | | |
|---|---|---|---|---|
| 7,677,117 B2* | 3/2010 | Perriard | ............... | B60T 8/52 |
| | | | | 73/779 |
| 7,683,274 B2* | 3/2010 | Dellac | ............... | G01L 5/0004 |
| | | | | 177/211 |
| 7,770,461 B2* | 8/2010 | Perriard | ............... | B60T 13/66 |
| | | | | 188/181 T |
| 8,649,906 B2* | 2/2014 | Bischoff | ............... | B25J 13/085 |
| | | | | 700/258 |
| 9,016,134 B2* | 4/2015 | Freshour | ............... | G01L 5/0004 |
| | | | | 73/774 |
| 2006/0266561 A1* | 11/2006 | Dellac | ............... | G01L 5/0004 |
| | | | | 177/136 |
| 2014/0331756 A1* | 11/2014 | Shimoyama | ............... | G01L 5/0057 |
| | | | | 73/117.03 |
| 2014/0331757 A1* | 11/2014 | Shimoyama | ............... | G01L 5/0057 |
| | | | | 73/117.03 |
| 2014/0331789 A1* | 11/2014 | Shimoyama | ............... | G01L 3/108 |
| | | | | 73/862.338 |

FOREIGN PATENT DOCUMENTS

| | | |
|---|---|---|
| JP | 4347784 B | 7/2009 |
| JP | 2011-085514 A | 4/2011 |
| JP | 4888345 B | 12/2011 |

OTHER PUBLICATIONS

First Notification of Refusal dated Mar. 10, 2015.

* cited by examiner

BUSH COMPONENT FORCE DETECTION DEVICE

CROSS-REFERENCE TO RELATED APPLICATIONS

The present application claims priority from Japanese Patent Application No. 2013-098595 filed on May 8, 2013, the entire contents of which are hereby incorporated by reference.

BACKGROUND

1. Technical Field

The present invention relates to a bush component force detection device that detects a component force acting on a bush which is provided in a connecting portion of a structural member of a vehicle.

2. Related Art

The suspension of a vehicle has an effect on riding comfort and driving stability of the vehicle, and so component forces of the suspension are measured to evaluate the riding comfort and driving stability of the vehicle. A vehicle is designed based on the evaluation of the riding comfort and driving stability of the vehicle. Therefore, the riding comfort and driving stability of a vehicle can be improved by accurately measuring dynamic change in each component force in portions of the suspension.

Various methods have been proposed to detect changes in component forces such as yaw, pitch, and roll which act on the portions of the suspension mechanism. For example, Japanese Unexamined Patent Application Publication No. 2011-85514 discloses a load measurement sensor which includes a plurality of strain gauges and is tightly fixed to a rod-like body such as a damper in the suspension mechanism of a vehicle.

Here, shafts, which serve as connecting portions between the frame of the vehicle and an arm member, are base points for allowing the arm member to be moved, and thus for the design and adjustment of the suspension mechanism, it is necessary to detect component forces in the connecting portions between the frame and the arm member with high accuracy.

However, even if a sensor is mounted on a damper, an arm member or the like as described above for measuring the behavior of each of the portions of the suspension, the behavior of each shaft (movable connecting portion of each member) may not be measured accurately. That is, in order to measure the behavior of each shaft of the suspension, calculation is performed based on a result of measurement made by a sensor which is mounted on an arm or a damper connected to the shaft to be measured, and thus the calculation gives only a predicted value. Particularly, when an elastic body is used such as a rubber bush which serves as a bearing of the suspension, it is necessary to take spring characteristics and holes into consideration, and thus such a predicted value may be much different from an actual component force. Though it is possible to mount a sensor on the bearing itself, the mounting space for the sensor needs to be ensured in this case by reducing the bearing in size, then not only the production cost will increase but also the spring characteristics of the bearing will change, and thus an adverse effect on the design may be caused.

SUMMARY OF THE INVENTION

The present invention has been designed in consideration of the circumstances described above, and an object thereof is to provide a bush component force detection device capable of detecting a change in component forces for each axis in a suspension mechanism of a vehicle with high accuracy.

A first aspect of the present invention provides a bush component force detection device that detects a component force acting on a cylindrical bush which is inserted into a hole provided in a frame of a vehicle to pivotally support a rod-like member inside thereof, the bush component force detection device including: an outer ring provided between the bush and the hole with predetermined space from the bush and configured to surround an outer circumferential surface of the bush and to be attached on an inner circumferential surface of the hole; and a sensing unit that is a cylindrical member disposed between the bush and the outer ring and configured to surround the bush, the sensing unit having one end connected with an outer side of the bush, the other end connected with the outer ring, and strain gauges disposed on an outer circumferential surface thereof. The strain gauges disposed on the outer circumferential surface of the sensing unit may detect a component force acting in a first radial direction, a component force acting in a second radial direction perpendicular to the first radial direction, a component force acting in an axial direction, a component force acting around an axis in the first radial direction, a component force acting around an axis in the second radial direction, and a component force acting around the axial direction.

The outer ring and the sensing unit may be detachably connected to each other.

DETAILED DESCRIPTION

FIGS. 1 to 9 illustrate an implementation of the present invention.

Figure 1:
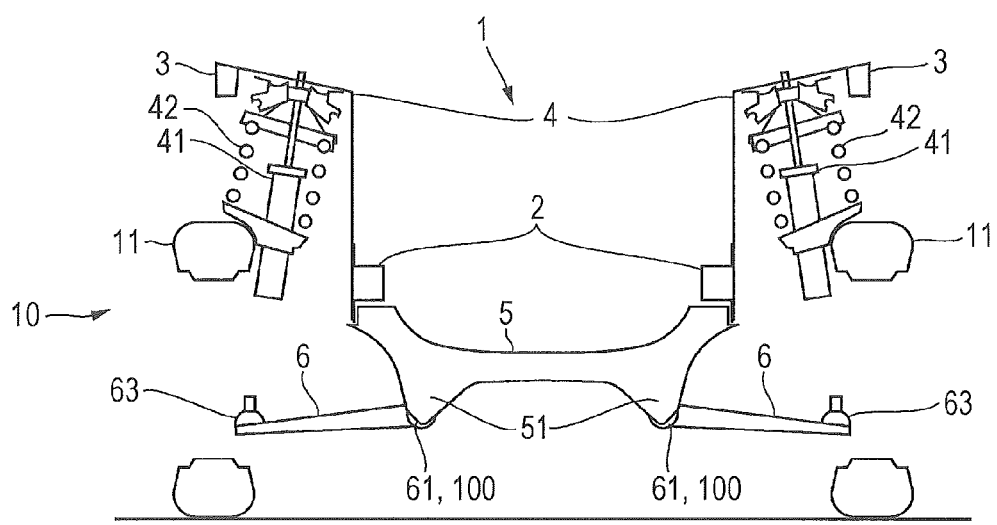
FIG. 1 is a schematic front view of a suspension device of a vehicle according to an implementation of the present invention.
Figure 2:
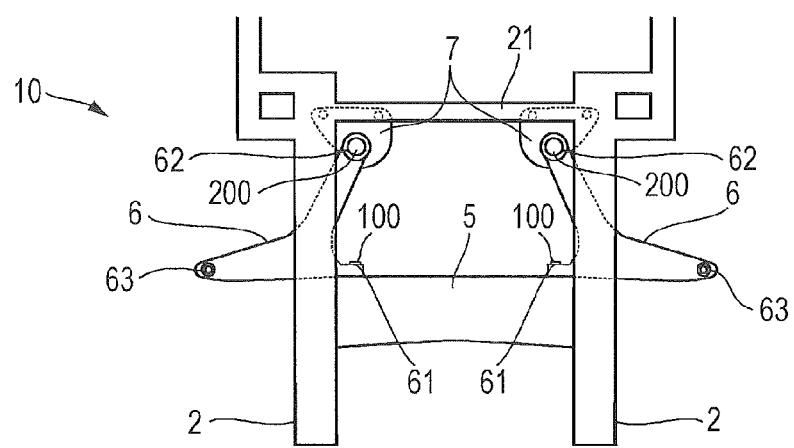
FIG. 2 is a schematic plan view from above of the suspension device of FIG. 1.

As illustrated in FIGS. 1 and 2, a vehicle body 1 of a vehicle equipped with a bush component force detection device of the implementation includes side members 2, upper members 3, strut towers 4, a cross member 5, and a suspension device 10.

Each of the side members 2 is a structural member that extends from a toe board (not illustrated) in a fore-and-aft direction of the vehicle, the toe board serving as a partition wall at the front of the cabin. The side members 2 are provided as a pair on the right and left sides of the engine compartment of the vehicle. The rear ends of the side members 2 on the right and left are connected to each other by a connecting member 21.

The upper members 3 are provided over the right and left side members 2, respectively in a direction outwardly of the vehicle. Each of the upper members 3 is a structural member that extends from the partition wall at the front of the cabin along the right and left edges of an engine hood in a fore-and-aft direction of the vehicle.

The strut towers 4 are provided between the outer ends of the side members 2 in a vehicle width direction and the inner ends of the upper members 3 in a vehicle width direction. The upper ends of the shock absorbers 41 described below are fixed to the strut towers 4.

The cross member 5 is a structural member that extends in a vehicle width direction and the both ends thereof are secured to the lower surfaces of the right and left side members 2 using a bolt or the like. Under the cross member 5, brackets 51 project downward which are connected to the respective lower arms 6 described below.

The suspension device 10 includes shock absorbers 41, lower arms 6, and support plates 7.

The shock absorbers 41 are each a hydraulic shock absorber that has a coil spring 42 on the outer circumferential surface. The upper end of each shock absorbers 41 is rotatably mounted on corresponding one of the strut towers 4 and the lower end thereof is secured and fixed to the upper end of a front wheel suspension member (not illustrated) which rotatably supports a front wheel 11.

The lower arms 6 are suspension arms that are provided as a pair on the right and left sides in a vehicle width direction to support the lower ends of front wheel suspension members. Front bush mounts 61 are provided at the front side in the vehicular fore-and-aft direction of the inner ends of the right and left lower arms 6 in a vehicle width direction. Rear bush mounts 62 are provided at the rear side in the vehicular fore-and-aft direction of the inner ends of the right and left lower arms 6 in a vehicle width direction. Ball joints 63 are provided at the outer ends of the vehicle in a vehicle width direction.

Figure 3A:
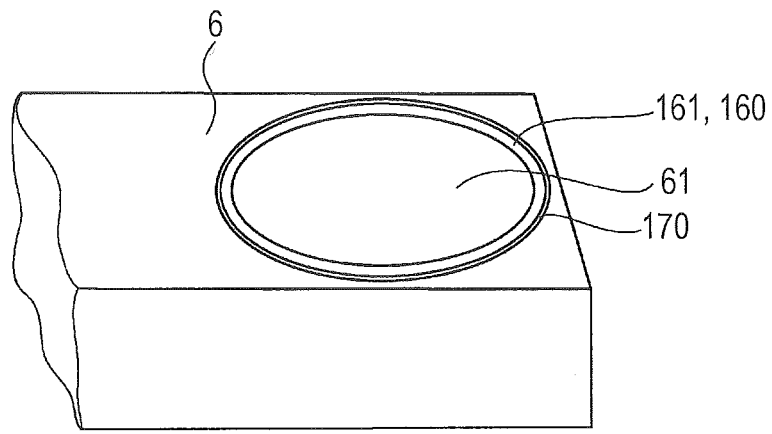
FIGS. 3A and 3B are perspective views of a mount of a front bush and the front bush of the implementation, respectively.

As illustrated in FIG. 3A, each of the front bush mounts 61 is a cylindrically shaped hole into which a front bush 100 is press-fitted and fixed and which has a central axis extending along the rocking central axis of a corresponding lower arm 6. The front bush mount 61 is provided with the below-described front bush component force detection device 140.

Figure 3B:
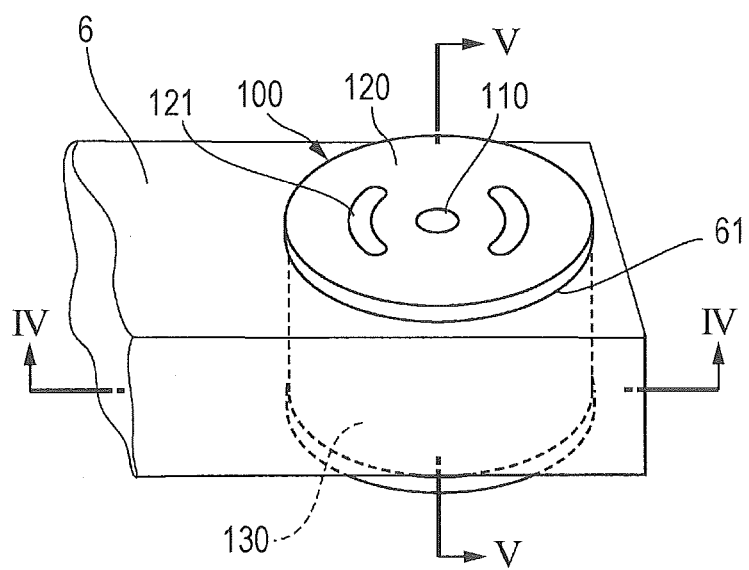
Figure 4:
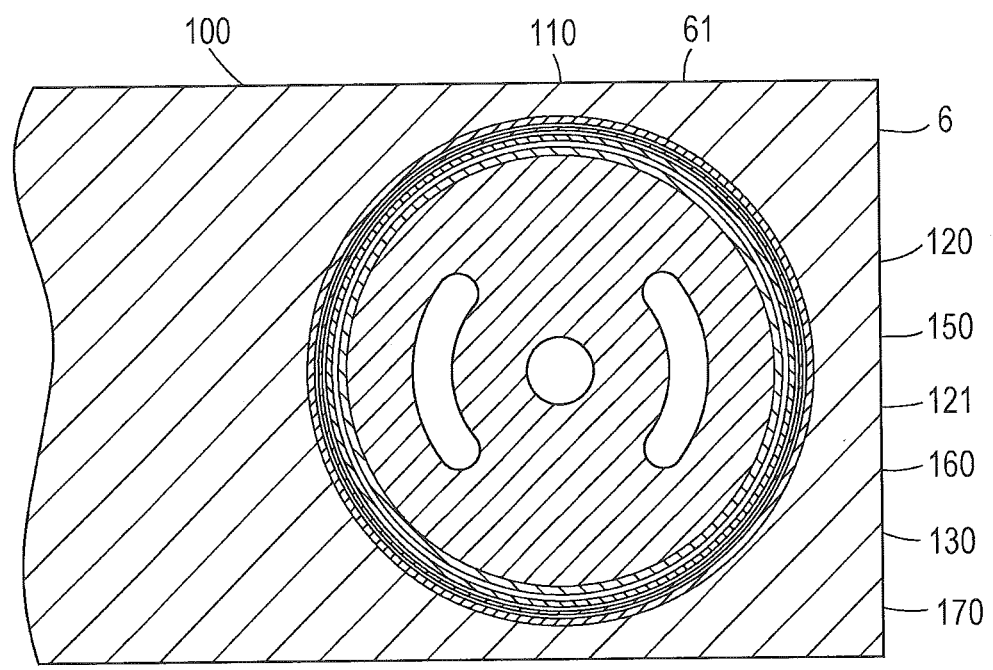
FIG. 4 is a cross-sectional view taken along line IV-IV of FIG. 3B.
Figure 5:
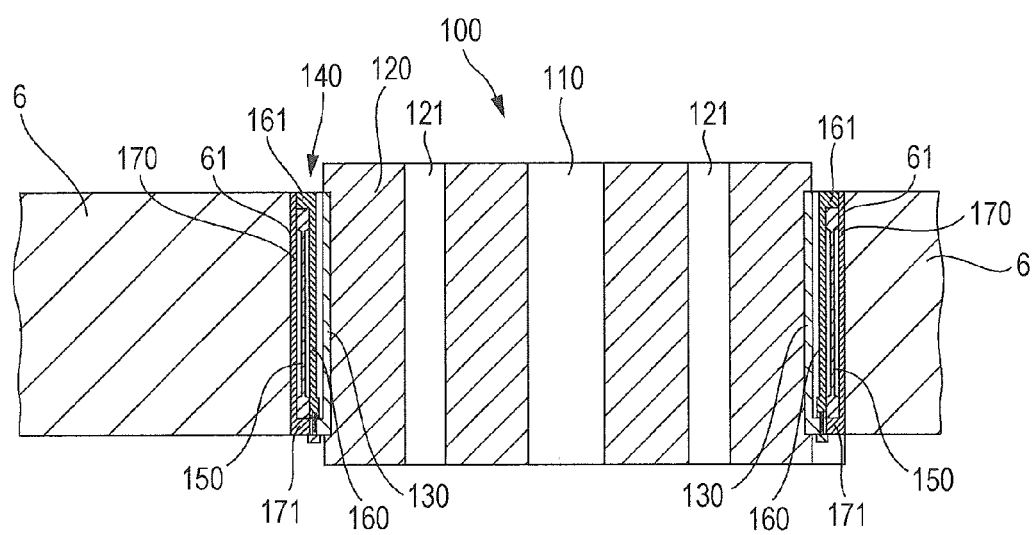
FIG. 5 is a cross-sectional view taken along line V-V of FIG. 3B.
Figure 6:
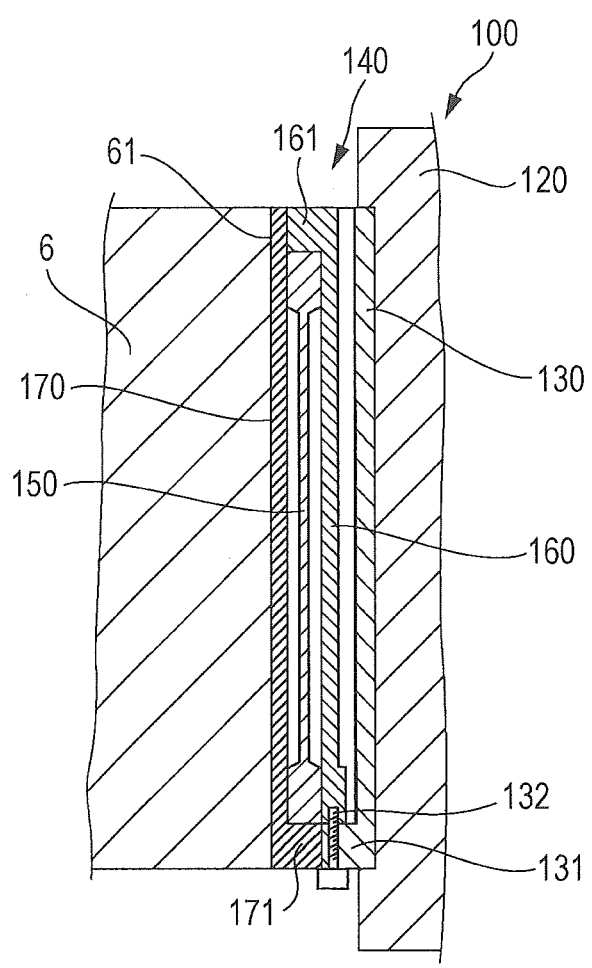
FIG. 6 is an enlarged schematic cross-sectional view of part of FIG. 5.

As illustrated in FIG. 3B, the front bush 100 is a rubber bush for vibration isolation, and includes an inner cylinder 110, a rubber 120, and an outer cylinder 130. The inner cylinder 110 and the outer cylinder 130 are substantially concentric cylindrical members, the inner cylinder 110 is inserted inside the outer cylinder 130, and the rubber 120 is provided between the inner cylinder 110 and the outer cylinder 130. In the rubber 120, bores 121 are formed as a pair on the right and left. The bores 121 are openings through in the axial direction of the inner cylinder 110. Each of the bores 121 is formed in an arc-shape in a plan view centered about the inner cylinder 110, and has different elastic abilities (spring characteristics) in a radial direction (the x-axis direction) of the rubber 120 and in another radial direction (the y-axis direction) perpendicular to the x-axis. The axial lengths of the inner cylinder 110 and the outer cylinder 130 are approximately the same as the axial length of the inner circumferential surface of the front bush mount 61.

Each lower arm 6 is connected to the corresponding bracket 51 of the cross member 5 by a bolt (not illustrated) which is inserted into the inner cylinder 110 of the front bush 100 which is press-fitted into the front bush mount 61. The front bush mount 61 is provided with a front bush component force detection device 140 for detecting a component force acting on the front bush 100. The details of the front bush component force detection device 140 will be described below.

Each of the rear bush mounts 62 is a portion into which the rear bush 200 is press-fitted and fixed, and specifically is a cylindrically shaped hole having a central axis extending along the rocking central axis of the lower arm 6 in the vehicular fore-and-aft direction. The rear bush 200 is a rubber bush for vibration isolation in a similar configuration to that of the front bush 100, and includes an inner cylinder, a rubber, and an outer cylinder. The inner cylinder and the outer cylinder are substantially concentric cylindrical members, the inner cylinder is inserted inside the outer cylinder, and the rubber is provided between the inner cylinder and the outer cylinder. The lower arm 6 is connected to a corresponding support plate 7 by a bolt which is inserted into the inner cylinder of the rear bush 200 which is press-fitted into the rear bush mount 62.

The support plate 7 is a tabular member for supporting a lower portion of the lower arm 6 and is connected to a corresponding rear bush 200 by a bolt and secured to a portion near the rear end of the side member 2 by a bolt or the like, the rear bush 200 being press-fitted into the rear bush mount 62 of the lower arm 6 on each side.

Next, the front bush component force detection device 140 for detecting a component force will be described with reference to FIGS. 3 to 9, the component force acting on the front bush 100 which is provided in the suspension device 10.

The front bush component force detection device 140 detects six component forces acting on the front bush 100 which connects the lower arm 6 and the cross member 5. The front bush component force detection device 140 includes a sensing unit 150, an inner ring 160, and an outer ring 170 which are cylindrical members having approximately the same center and different diameters, the sensing unit 150 having a bridge circuit including a plurality of strain gauges. The sensing unit 150, the inner ring 160, and the outer ring 170 are substantially concentric to each other, but may not strictly be concentric.

The sensing unit 150 is a cylindrical member having a larger diameter than that of the inner ring 160 and a smaller diameter than that of the outer ring 170, and is disposed concentrically with the front bush mount 61 which is open in a cylindrical shape. The sensing unit 150 has the upper end and the lower end which are thicker than the middle portion therebetween, the upper end being connected to the below-described inner ring flange 161, the lower end being connected to the below-described outer ring flange 171. The middle portion is formed to have a constant thickness and a plurality of strain gauges described below is attached on the outer surface of the middle portion.

The inner ring 160 is a cylindrical member having a smaller diameter than that of the sensing unit 150. The lower end of the inner ring 160 is connected to an outer cylinder flange 131 by a mounting bolt 132, the outer cylinder flange 131 projecting radially outward from the lower end of the outer cylinder 130 of the front bush 100. That is, the front bush 100, which is press-fitted into the front bush mount 61, is secured to the inner ring 160 by the mounting bolt 132 which is inserted into the outer cylinder flange 131.

Thus, when the front bush 100 is replaced, the mounting bolt 132 is removed to separate the front bush 100 from the front bush mount 61, and a new front bush 100 is press-fitted into the inner circumferential surface of the inner ring 160, then the mounting bolt 132 is tightened.

The outer ring 170 is a cylindrical member which is provided on the inner circumferential surface of the front bush mount 61 and has a larger diameter than that of the sensing unit 150. Although the outer ring 170 is screw-clamped to the inner circumferential surface of the front bush mount 61, without being limited to this, the outer ring 170 and the inner circumferential surface of the front bush mount 61 may be integrated together so that the outer ring 170 forms the inner circumferential surface of the front bush mount 61.

In the upper end of the inner ring 160, an inner ring flange 161 is formed which projects radially outward from the outer circumferential surface of the front bush 100, and in the lower end of the outer ring 170, an outer ring flange 171 is formed which projects radially inward from the inner circumferential surface. The upper end of the sensing unit 150 is connected to the inner ring flange 161, and the lower end of the sensing unit 150 is connected to the outer ring flange 171. That is, the sensing unit 150 is disposed between the inner ring 160 and the outer ring 170, and the upper end and the lower end of the sensing unit 150 are supported by the inner ring 160 and the outer ring 170, respectively. Certain space is provided by the inner ring flange 161 between the inner circumferential surface of the sensing unit 150 and the outer circumferential surface of the inner ring 160, and certain space is provided by the outer ring flange 171 between the outer circumferential surface of the sensing unit 150 and the inner circumferential surface of the outer ring 170. Due to the space provided, the sensing unit 150 is deformable in radially inward and outward directions.

The front bush component force detection device 140 includes Fx detection system, Fy detection system, Fz detection system, Mx detection system, My detection system, and Mz detection system, each of which has a bridge circuit including strain gauges provided in the sensing unit 150.

Fx detection system detects a force Fx acting on the sensing unit 150 in a radial direction (hereinafter x-axis direction). Fy detection system detects a force Fy acting on the sensing unit 150 in a radial direction (hereinafter y-axis direction) perpendicular to the x-axis direction. Fz detection system detects a force Fz acting on the sensing unit 150 in an axial direction (hereinafter z-axis direction). Mx detection system detects a moment Mx acting on the sensing unit 150 around the x-axis. My detection system detects a moment My acting on the sensing unit 150 around the y-axis. Mz detection system detects a moment Mz acting on the sensing unit 150 around the z-axis.

Each of Fx detection system, Fy detection system, Fz detection system, Mx detection system, My detection system, and Mz detection system has a bridge circuit including four strain gauges.

Figure 7:
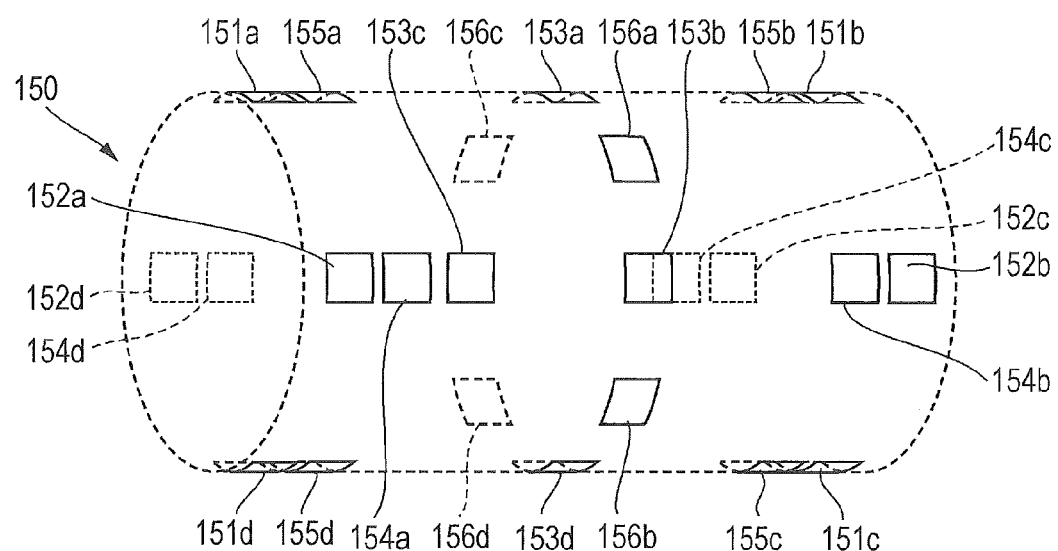
FIG. 7 is a schematic perspective view of a sensing unit of the implementation.

As illustrated in FIG. 7, Fx detection system has strain gauges 151a, 151b, 151c, and 151d. The strain gauges 151a to 151d are strain gauges for a single axis, and are attached on the outer circumferential surface of the sensing unit 150 so that the direction of detection is parallel to the central axis direction of the sensing unit 150.

Figure 8A:
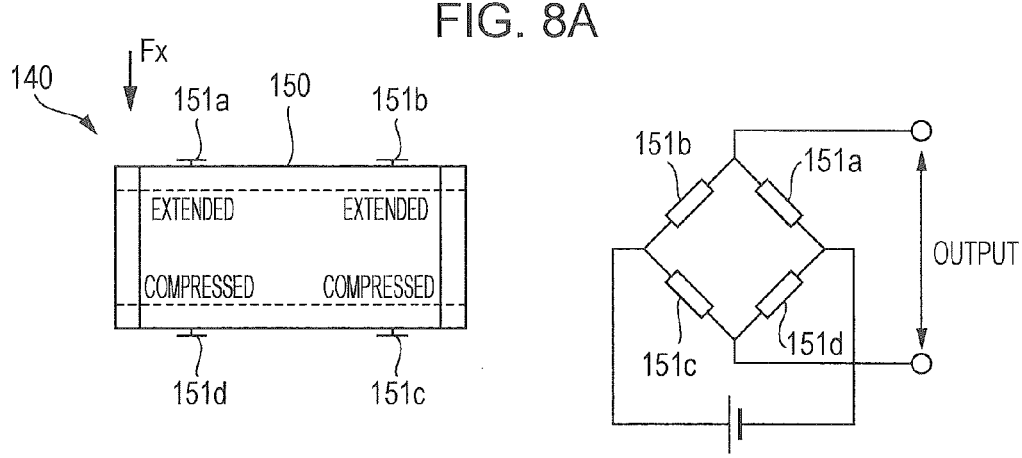
FIGS. 8A to 8C are diagrams each illustrating a configuration of a bridge circuit of a force detection system in a six component force detection device.

As illustrated in FIG. 8A, in the bridge circuit of Fx detection system, the strain gauges 151a to 151d are sequentially connected in a loop, and the positive electrode and negative electrode of a power supply are respectively connected to a point between the strain gauges 151b and 151c and a point between the strain gauges 151a and 151d, thereby generating a potential difference across a point between the strain gauges 151a, 151b and a point between strain gauges 151c and 151d.

As illustrated in FIG. 7, Fy detection system has strain gauges 152a, 152b, 152c, and 152d. The strain gauges 152a to 152d are strain gauges for a single axis, and are attached on the outer circumferential surface of the sensing unit 150 so that the direction of detection is parallel to the central axis direction of the sensing unit 150 and the positions of the strain gauges 152a to 152d are 90 degrees shifted in phase around the central axis of the sensing unit 150 with respect to the attachment positions of the strain gauges 151a to 151d.

Figure 8B:
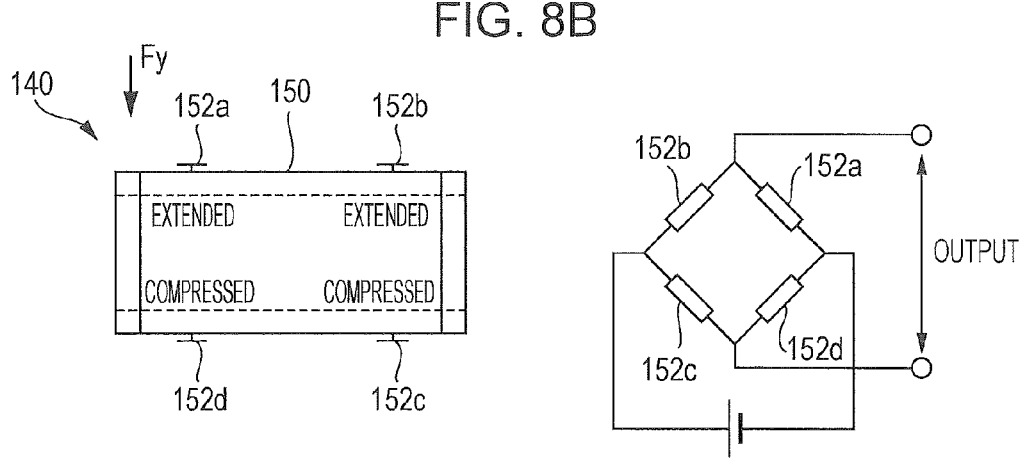

As illustrated in FIG. 8B, in the bridge circuit of Fy detection system, the strain gauges 152a to 152d are sequentially connected in a loop, and the positive electrode and negative electrode of a power supply are respectively connected to a point between the strain gauges 152b and 152c and a point between the strain gauges 152a and 152d, thereby generating a potential difference across a point between the strain gauges 152a and 152b and a point between strain gauges 152c and 152d.

As illustrated in FIG. 7, Fz detection system has strain gauges 153a, 153b, 153c, and 153d. The strain gauges 153a to 153d are strain gauges for a single axis, and are attached on the outer circumferential surface of the sensing unit 150 so that the direction of detection is parallel to the central axis direction of the sensing unit 150. The strain gauge 153a is disposed at the midpoint between the strain gauges 151a and 151b, and the strain gauges 153b to 153d are disposed at the positions 90 degrees, 180 degrees, and 270 degrees shifted in phase, respectively around the central axis of the sensing unit 150 with respect to the strain gauge 153a.

Figure 8C:
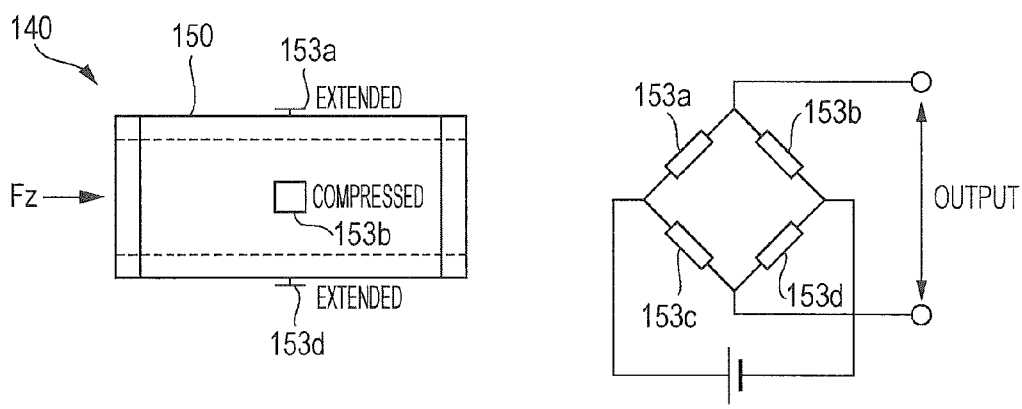

As illustrated in FIG. 8C, in the bridge circuit of Fz detection system, the strain gauges 153a to 153d are sequentially connected in a loop, and the positive electrode and negative electrode of a power supply are respectively connected to a point between the strain gauges 153a and 153c and a point between the strain gauges 153b and 153d, thereby generating a potential difference across a point between the strain gauges 153a and 153b and a point between strain gauges 153c and 153d.

As illustrated in FIG. 7, Mx detection system has strain gauges 154a, 154b, 154c, and 154d. The strain gauges 154a to 154d are strain gauges for a single axis, and are attached on the outer circumferential surface of the sensing unit 150 so that the direction of detection is parallel to the central axis direction of the sensing unit 150. The strain gauges 154a to 154d are disposed adjacent to the strain gauges 152a to 152d, respectively in the central axis direction of the sensing unit 150.

Figure 9A:
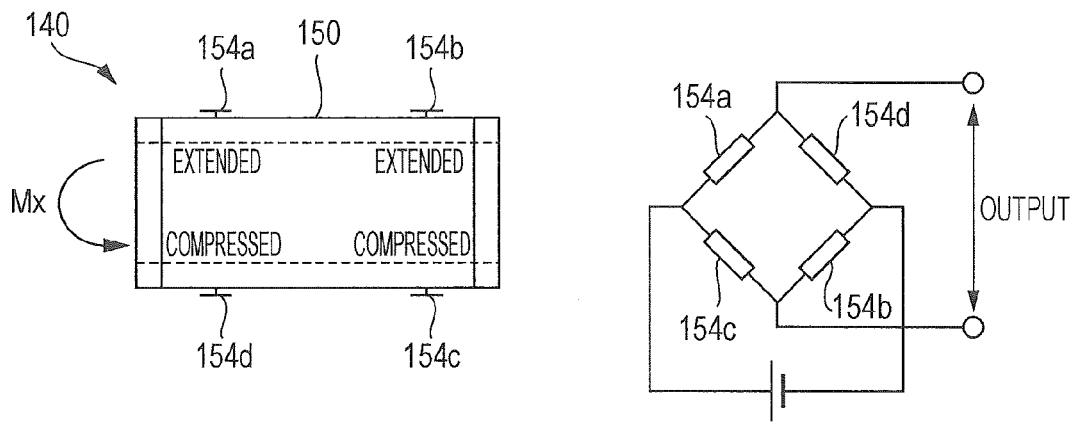
FIGS. 9A to 9C are diagrams each illustrating a configuration of a bridge circuit of a moment detection system in the six component force detection device.

As illustrated in FIG. 9A, in the bridge circuit of Mx detection system, the strain gauges 154a to 154d are sequentially connected in a loop, and the positive electrode and negative electrode of a power supply are respectively connected to a point between the strain gauges 154a, 154c and a point between the strain gauges 154b and 154d, thereby generating a potential difference across a point between the strain gauges 154a and 154b and a point between strain gauges 154c and 154d.

As illustrated in FIG. 7, My detection system has strain gauges 155a, 155b, 155c, and 155d. The strain gauges 155a to 155d are strain gauges for a single axis, and are attached on the outer circumferential surface of the sensing unit 150 so that the direction of detection is parallel to the central axis direction of the sensing unit 150. The strain gauges 155a to 155d are disposed adjacent to the strain gauges 151a to 151d, respectively in the central axis direction of the sensing unit 150.

Figure 9B:
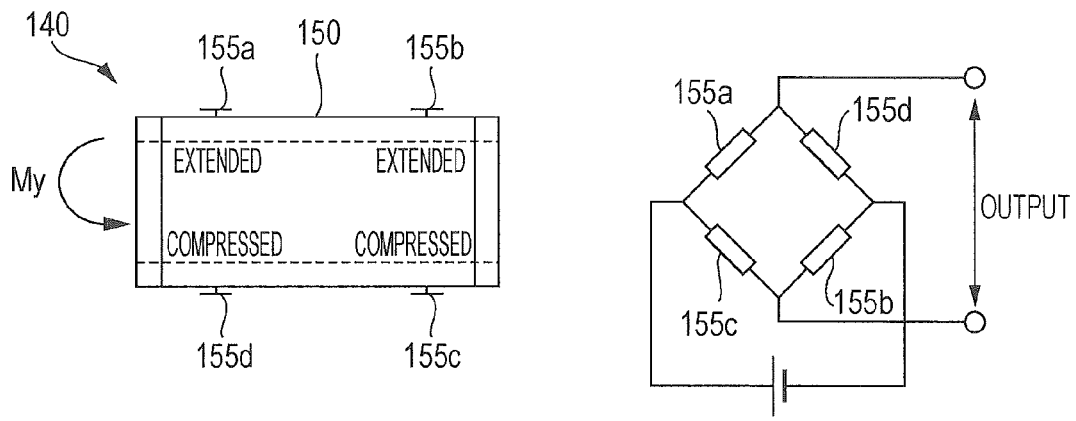

As illustrated in FIG. 9B, in the bridge circuit of My detection system, the strain gauges 155a to 155d are sequentially connected in a loop, and the positive electrode and negative electrode of a power supply are respectively connected to a point between the strain gauges 155a and 155c and a point between the strain gauges 155b and 155d, thereby generating a potential difference across a point between the strain gauges 155a and 155b and a point between strain gauges 155c and 155d.

As illustrated in FIG. 7, Mz detection system has strain gauges 156a, 156b, 156c, and 156d. The strain gauges 156a to 156d are shear strain gauges, and are attached on the outer circumferential surface of the sensing unit 150 so that the direction of detection is parallel to the circumferential direction of the sensing unit 150. The strain gauges 156a and 156b are disposed between the strain gauges 153a and 153b and between the strain gauges 153b and 153d, respectively. The strain gauges 156c and 156d are disposed symmetrically to the strain gauges 156a and 156b with respect to the central axis of the sensing unit 150.

Figure 9C:
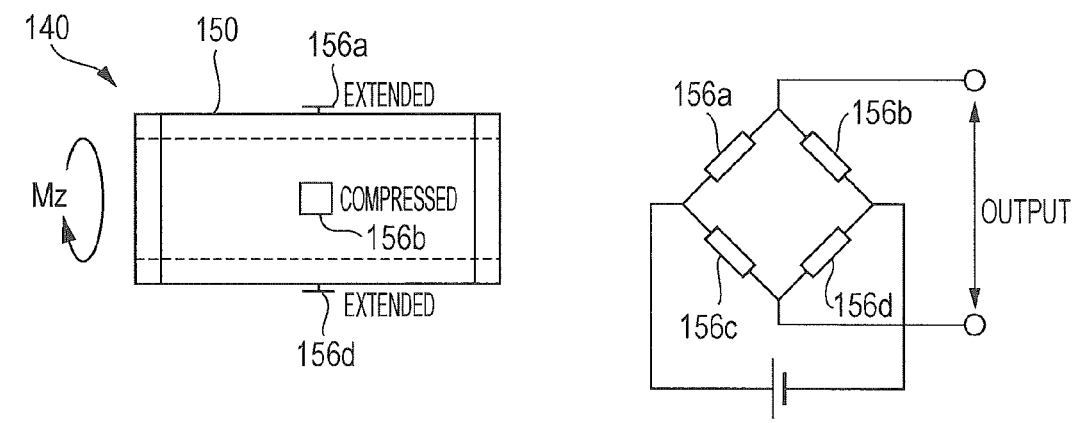

As illustrated in FIG. 9C, in the bridge circuit of Mz detection system, the strain gauges 156a to 156d are sequentially connected in a loop, and the positive electrode and negative electrode of a power supply are respectively connected to a point between the strain gauges 156a and 156c and a point between the strain gauges 156b and 156d, thereby generating a potential difference across a point between the strain gauges 156a and 156b and a point between strain gauges 156c and 156d.

The rear bush mount 62 is also provided with a rear bush detection device for detecting component forces acting on the rear bush 200. Similarly to the front bush component force detection device 140, the rear bush detection device includes an inner ring, an outer ring, and a sensing unit which are substantially concentric cylindrical members, the sensing unit having a bridge circuit including a plurality of strain gauges. The rear bush detection device is capable of detecting component forces acting in radial directions (x-axis direction and y-axis direction), a component force acting in the axial direction (z-axis direction), a component force acting around the x-axis, a component force acting around the y-axis, and a component force acting around the z-axis, all the component forces acting on the rear bush 200.

As described above, the sensing unit 150 of the front bush component force detection device 140 is provided on the inner circumferential surface of the front bush mount 61. For this reason, it is possible to directly detect a component force acting on the front bush 100 which is press-fitted into the front bush mount 61, and thus the six component forces acting on the connecting portion between the lower arm 6 and the cross member 5 may be accurately detected. That is, each component force acting on the front bush 100 is not determined based on component forces detected at positions away from the front bush 100, but is determined by direct detection using the front bush component force detection device 140 which is provided in the front bush 100 itself. Therefore, a complicated method of determination is not necessary, and accurate detection of the component forces is possible.

A component force acting on the front bush 100 is detected in such a manner that the front bush component force detection device 140 is provided in the front bush mount 61 of the lower arm 6, and the front bush 100, which is press-fitted into the front bush mount 61, is fixed to the front bush component force detection device 140. That is, the outer cylinder flange 131 formed in the front bush 100 and the inner ring 160 provided in the front bush component force detection device 140 are secured to each other by a bolt, and the front bush 100 is thereby mounted on the front bush component force detection device 140. Therefore, the front bush 100 can be easily replaced just by removing the mounting bolt 132 which connects the outer cylinder flange 131 and the inner ring 160. For this reason, even when the front bush 100 is replaced by a new one or one having different spring characteristics, the replacement can be easily made with the front bush component force detection device 140 mounted on the front bush mount 61, and the component forces acting on a new replaced front bush 100 can be immediately detected.

In the suspension device 10 of a vehicle in the present implementation, the lower arm 6 and the cross member 5 are connected via the front bush 100, the lower arm 6 and the support plate 7 are connected via the rear bush 200, and the front bush 100 and the rear bush 200 are provided with respective component force detection devices for detecting a component force acting of the bush. However, without being limited to this, a bush may be used for a bearing member of a connecting portion of other structural members, and the bush may be provided with a component force detection device which is similar to the front bush component force detection device 140 in the front bush 100.

In the present implementation, a rubber bush is used for the front bush 100 and the rear bush 200. However, without being limited to this, a bush using, for example, urethane may be adopted.

In the present implementation, a plurality of strain gauges is attached on the outer circumferential surface of the sensing unit 150. However, without being limited to this, the plurality of strain gauges may be attached on the inner circumferential surface of the sensing unit 150.

The invention claimed is:

1. A bush component force detection device that detects a component force acting on a cylindrical bush which is inserted into a hole provided in a frame of a vehicle to pivotally support a rod-like member inside thereof, the bush component force detection device comprising:
   an outer ring provided between the bush and the hole with predetermined space from the bush and configured to surround an outer circumferential surface of the bush and to be attached on an inner circumferential surface of the hole; and
   a sensing unit that is a cylindrical member disposed between the bush and the outer ring and configured to surround the bush, the sensing unit having one end of connected with an outer side of the bush, the other end connected with the outer ring, and a plurality of strain gauges disposed on an outer circumferential surface thereof.

2. The bush component force detection device according to claim 1, wherein the strain gauges disposed on the outer circumferential surface of the sensing unit detect a component force acting in a first radial direction, a component force acting in a second radial direction perpendicular to the first radial direction, a component force acting in an axial direction, a component force acting around an axis in the first radial direction, a component force acting around an axis in the second radial direction, and a component force acting around the axial direction.

3. The bush component force detection device according to claim 2, wherein the outer ring and the sensing unit are detachably connected to each other.

4. The bush component force detection device according to claim 1, wherein the outer ring and the sensing unit are detachably connected to each other.

* * * * *